(12) United States Patent
Moffitt

(10) Patent No.: US 10,114,157 B2
(45) Date of Patent: Oct. 30, 2018

(54) PULSE WIDTH CONTROLLER

(71) Applicant: Applied Materials, Inc., Santa Clara, CA (US)

(72) Inventor: Theodore P. Moffitt, Hillsboro, OR (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 1198 days.

(21) Appl. No.: 13/796,249

(22) Filed: Mar. 12, 2013

(65) Prior Publication Data

US 2014/0076863 A1 Mar. 20, 2014

Related U.S. Application Data

(60) Provisional application No. 61/703,487, filed on Sep. 20, 2012.

(51) Int. Cl.
*B23K 26/00* (2014.01)
*G02B 5/30* (2006.01)
(Continued)

(52) U.S. Cl.
CPC ............ *G02B 5/30* (2013.01); *B23K 26/0604* (2013.01); *B23K 26/0622* (2015.10);
(Continued)

(58) Field of Classification Search
CPC ........ B23K 26/00; B23K 26/06; B23K 26/08; B23K 26/38
(Continued)

(56) References Cited

U.S. PATENT DOCUMENTS 6,257,514 B1 7/2001 Morris et al.
6,404,710 B1 * 6/2002 Ichimura et al. .......... 369/44.23
(Continued)

FOREIGN PATENT DOCUMENTS

CN 1943083 A 4/2007
CN 102470484 A 5/2012
(Continued)

OTHER PUBLICATIONS

International Search Report and Written Opinion issued in corresponding application No. PCT/US2013/060451, dated Dec. 30, 2013; 11 total pages.
(Continued)

*Primary Examiner* — Dana Ross
*Assistant Examiner* — Ayub Maye
(74) *Attorney, Agent, or Firm* — Patterson + Sheridan LLP

(57) ABSTRACT

A pulse width controller for a thermal processing system is disclosed. Pulsed electromagnetic radiation is directed through a rotatable wave plate to a polarizing beam splitter, which reflects and transmits according to the phase angle of the wave plate. Radiation transmitted by the polarizing beam splitter is directed into an optical circuit that returns the radiation to the polarizing beam splitter after a transit time. A second rotatable wave plate is positioned in the optical circuit. The polarizing beam splitter reflects and transmits the returned radiation according to the phase angle of the second rotatable wave plate. A second pulse width controller may be nested in the optical circuit, and any number of pulse width controllers may be nested.

8 Claims, 5 Drawing Sheets

(51) Int. Cl.
- *B23K 26/06* (2014.01)
- *B23K 26/0622* (2014.01)
- *H01S 3/00* (2006.01)
- *G02B 27/28* (2006.01)

(52) U.S. Cl.
CPC ...... *B23K 26/0643* (2013.01); *B23K 26/0648* (2013.01); *G02B 27/283* (2013.01); *H01S 3/0057* (2013.01)

(58) Field of Classification Search
USPC .............. 219/121.6, 121.61, 121.73, 121.74, 219/121.75
See application file for complete search history.

(56) References Cited

U.S. PATENT DOCUMENTS

| | | | |
|---|---|---|---|
| 6,552,855 B1* | 4/2003 | Kowarz et al. | 359/627 |
| 6,928,093 B2 | 8/2005 | Webb et al. | |
| 7,035,012 B2 | 4/2006 | Govorkov et al. | |
| 7,084,959 B2 | 8/2006 | Albert | |
| 7,184,216 B2 | 2/2007 | Govorkov et al. | |
| 7,286,282 B2* | 10/2007 | Kojima et al. | 359/326 |
| 7,369,597 B2 | 5/2008 | Smith et al. | |
| 7,738,515 B2 | 6/2010 | Spinelli et al. | |
| 2004/0240492 A1 | 12/2004 | Kojima et al. | |
| 2005/0002425 A1 | 1/2005 | Govorkov et al. | |
| 2006/0102604 A1* | 5/2006 | Dane et al. | 219/121.74 |
| 2009/0032511 A1 | 2/2009 | Adams et al. | |
| 2009/0257464 A1* | 10/2009 | Dantus et al. | 372/25 |
| 2010/0025387 A1* | 2/2010 | Arai et al. | 219/121.69 |
| 2012/0061356 A1* | 3/2012 | Fukumitsu | 219/121.61 |

FOREIGN PATENT DOCUMENTS

| | | |
|---|---|---|
| EP | 1 723 704 B1 | 7/2009 |
| JP | 2003-287706 A | 10/2003 |
| JP | 2004-055626 | 2/2004 |
| JP | 2008-281672 A | 11/2008 |
| KR | 10-0767622 B1 | 10/2007 |
| WO | 2011/064059 A1 | 6/2011 |

OTHER PUBLICATIONS

Taiwanese Office Action (with attached English translation of the Search Report) for Application No. 102131736; dated Nov. 3, 2016; 8 total pages.

Chinese Office Action (with attached English translation of the Search Report) dated Feb. 27, 2017, for Chinese Patent Application No. 2016100533679.

Taiwan Office Action (with attached English translation of the Search Report) dated Mar. 27, 2017, for Taiwan Patent Application No. 102134141.

Chinese Office Action (with attached English translation of the Search Report) for Application No. 201380048129.3; dated Nov. 28, 2016; 11 total pages.

* cited by examiner

PULSE WIDTH CONTROLLER

CROSS-REFERENCE TO RELATED APPLICATIONS

This application claims benefit of U.S. Provisional Patent Application Ser. No. 61/703,487, filed Sep. 20, 2012, which is incorporated herein by reference.

FIELD

Embodiments described herein relate to apparatus and methods of laser thermal processing. More specifically, apparatus and methods described herein relate to a pulse width controller incorporated in a laser thermal processing apparatus.

DESCRIPTION OF THE RELATED ART

Thermal processing is commonly practiced in the semiconductor industry. Semiconductor substrates are subjected to thermal processing in the context of many transformations, including doping, activation, and annealing of gate source, drain, and channel structures, siliciding, crystallization, oxidation, and the like. Over the years, techniques of thermal processing have progressed from simple furnace baking, to various forms of increasingly rapid thermal processing such as RTP, spike annealing, and laser annealing.

Conventional laser annealing processes use laser emitters that may be semiconductor or solid state lasers with optics that focus, defocus, or variously image the laser light into a desired shape. A common approach is to image the laser light into a line or thin rectangle image. The laser light is scanned across a fixed substrate or the substrate is scanned beneath the laser light to process the entire surface of the substrate.

As device geometry continues to decline, semiconductor manufacturing processes such as thermal processing are challenged to develop increased precision. In many instances, pulsed laser processes are being explored to reduce overall thermal budget and reduce depth and duration of energy exposure at the substrate. Challenges remain, however, in creating laser pulses having a temporal shape that affords the desired processing performance, with the uniformity needed for uniform processing across the surface of a substrate. Thus, there is a continuing need for apparatus and methods of adjusting the temporal shape of an energy pulse.

SUMMARY OF THE INVENTION

A optical system for controlling width of an energy pulse, and an apparatus including such an optical system, are disclosed. The optical system features a rotatable wave plate that outputs oriented radiation to a polarizing beam splitter. Radiation transmitted by the polarizing beam splitter is routed through an optical circuit that has a second rotatable wave plate. Radiation from the second rotatable wave plate is routed back to the polarizing beam splitter along the axis of light originally reflected by the polarizing beam splitter. The first rotatable wave plate is rotated to control the fraction of radiation that enters the optical circuit, and the second rotatable wave plate is rotated to control the fraction of radiation in the optical circuit that exits through the polarizing beam splitter.

Multiple optical circuits may be nested in and/or pendant from a first optical circuit, each with its input and output optical gates. Optical delay legs may also be used in some embodiments to add further delay components.

The optical system described above may be included in a thermal processing apparatus featuring an energy source that produces radiant energy in pulses or continuous wave. The energy that has been routed through the pulse width controller is directed to an optical system for adjusting the spatial or temporal profile of the energy, such as a homogenizer, etalon, or fiber bundle. The energy may then be directed to an aperture to trim non-uniform edges, and then to a substrate to thermally process the substrate.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
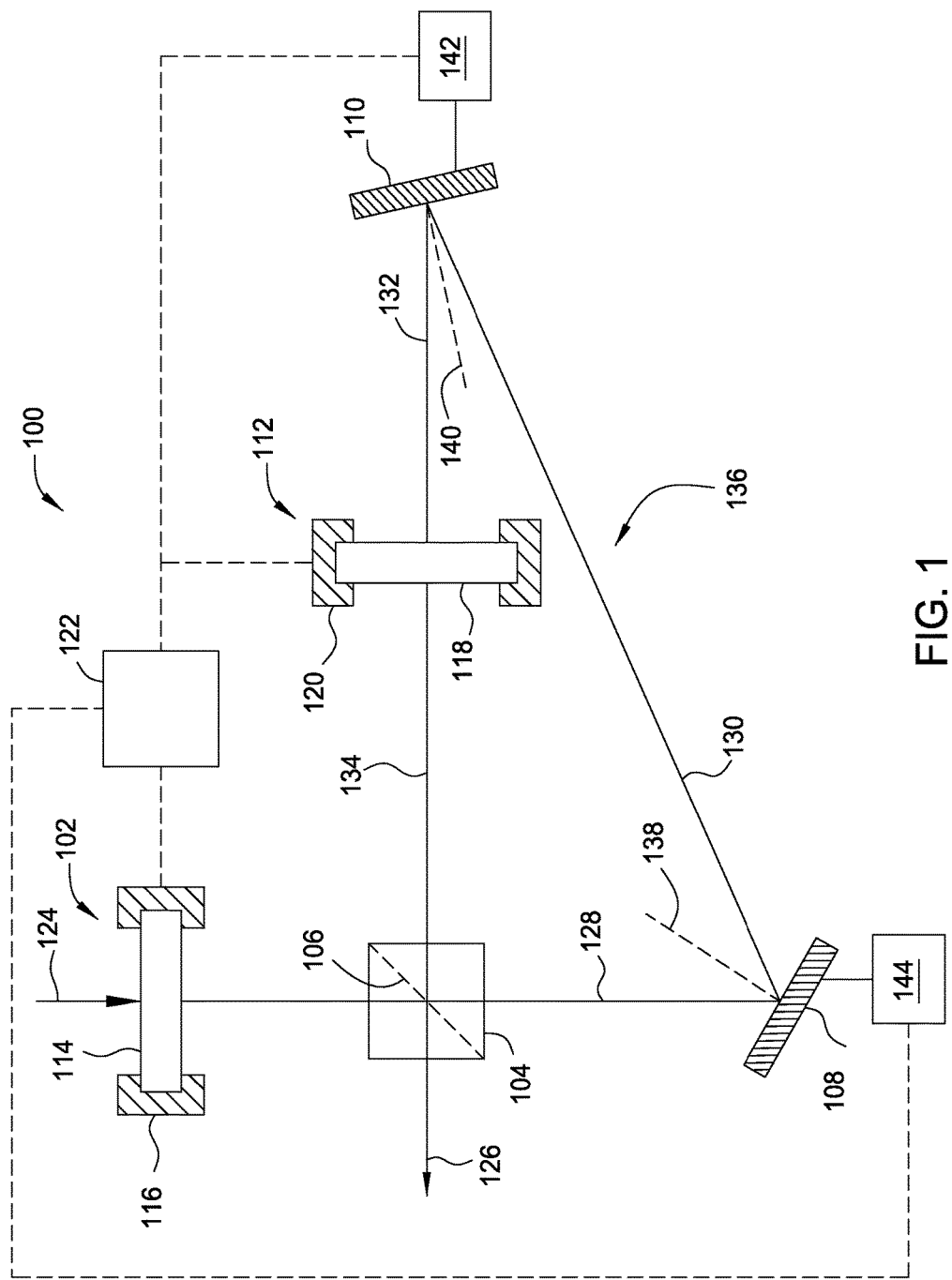
FIG. 1 is a schematic diagram of a pulse width controller according to one embodiment.

FIG. 1 is a schematic diagram of a pulse width controller 100 according to one embodiment. The pulse width controller 100 has a first rotatable wave plate 102, comprising a first wave plate 114 and a first actuator 116, optically coupled to a polarizing beam splitter 104. The polarizing beam splitter 104 has an optically active surface 106 that reflects a portion of incoming electromagnetic radiation along a reflecting axis 126 and transmits a portion of the incoming electromagnetic radiation along a transmitting axis 128. The position of the first wave plate 114, as rotated by the first actuator 116, determines the polarization axis of the radiation incident upon the polarizing beam splitter 104, and the angle of the polarization axis of the incident radiation, compared with the polarizing angle of the optical surface 106, determines the degree of reflection and transmission.

The transmitted radiation 128 is routed to an optical circuit 136 that delivers a return radiation 134 to the polarizing beam splitter along the reflecting axis 126. At least a first reflector 108 and a second reflector 110 make up the optical circuit 136. The first reflector 108 is disposed along the transmitting axis 128 of the polarizing beam splitter 104, faces a first deflection direction 138, and propagates a first deflected radiation along a first deflection axis 130. The second reflector 110 is positioned to receive radiation originating from the first reflector 108, faces a second deflection direction 140, and propagates a second deflected radiation 132 along the reflecting axis 126 of the polarizing beam splitter 104. This may be done using only two reflectors in some embodiments, while in other embodiments more reflectors may be disposed in the optical circuit. In one embodiment, a third reflector (not shown) is positioned along the first deflection axis 130 and propagates radiation along a third deflection direction to the second reflector, with the angles of the reflectors suitably adjusted to align the radiation along the reflecting axis 126.

A second wave plate 118 is disposed in the optical circuit 136 at any desired point. The second wave plate 118 may be disposed along the transmitting axis 128 between the polarizing beam splitter 104 and the first reflector 108, along the first deflection axis 130, along the reflecting axis 126 between the polarizing beam splitter 104 and the second reflector 110, or at any position in the optical circuit 136 between the first reflector 108 and the second reflector 110. The second wave plate 118 may be a second rotatable wave plate 112, comprising the second wave plate 118 and a second actuator 120, if desired.

The second wave plate 118 rotates the polarization axis of the second deflected radiation 132 by 90°, such that the return radiation 134 will pass through the optically active surface 106 of the polarizing beam splitter 104. The return radiation 134 thus propagates along the reflecting axis 126 slightly later than the radiation originally reflected along the reflecting axis 126 by the transit time of the optical circuit 136. If the transit time of the optical circuit 136 is less than the time duration of the incident pulse, the radiation reflected along the reflection axis 126 and the return radiation 134 will overlap to form a single extended pulse. The extent of the broadening may be controlled by setting the first rotatable wave plate 102. If a difference between the polarization angle of the first rotatable wave plate 102 and the polarization angle of the optically active surface 106 approaches 90°, most incident radiation will be reflected along the reflection axis 126, and the resulting pulse will be broadened only slightly with a decay tail added by the circulated portion of the incident pulse. If the difference is nearly zero, the resulting pulse will be substantially delayed by the circuit transit time and slightly broadened with a rise tail created by the initially reflected radiation. If the difference is substantially far from either extreme (0° or 90°), the resulting pulse will be broadened and will be bimodal, with the intensities of the two peaks determined by the phase difference.

The second wave plate 118 may have a polarization angle that does not align with the polarization angle of the optically active surface 106. In such an embodiment, the return radiation 134 will be partially transmitted and partially reflected at the optically active surface 106, depending on the phase angle difference between the wave plate 118 polarization angle and the polarization angle of the optically active surface 106. A plurality of pulses will then emerge as the radiation circulates around the optical circuit 136, and the intensity of each pulse will be a function of the angles of the first wave plate 114 and the second wave plate 118. The second wave plate 118 may be coupled to a second actuator 120 to form a second rotatable wave plate 112, so the angle of the second wave plate 118 may be adjusted.

By varying the settings of the two rotatable wave plates 102 and 112, a pulse of electromagnetic radiation incident on the pulse width controller may be divided into two or more pulses propagating along the reflecting axis 126. The pulse width of the incident pulse may be effectively controlled by the pulse width controller 100 if the transit time of the optical circuit 136 is substantially less than the time duration of the incident pulse. For example, for an 8 nsec energy pulse, an optical circuit having a transit time substantially less than 8 nsec, such as a total length less than about 240 cm, for example a total length between about 100 cm and about 200 cm, will afford a single pulse having a tunable pulse width. A controller 122 may be coupled to the actuators 116 and 120 to control the relative phase angles of the two wave plates 114 and 118.

Actuators may be deployed to adjust the length of the optical circuit 136. In the embodiment of FIG. 1, a first actuator 144 is coupled to the first reflector 108 and a second actuator 142 is coupled to the second reflector 110. Each of the first actuator 144 and the second actuator 142 is coupled to the controller 122, and the controller 122 is programmed to adjust the positions of the first and second reflectors 108 and 110 to change the length of the optical circuit 136 while maintaining alignment of the first and second reflectors 108 and 110. In the embodiment of FIG. 1, each of the first and second actuators 144 and 142 may be a linear and rotational actuator, or one of the first actuator 144 or the second actuator 142 may be a linear and rotational actuator while the other is a rotational actuator only. In an alternative embodiment wherein three reflectors are included in a rectangular optical circuit, as described above, two adjacent reflectors of the optical circuit may be coupled to a support that is moved by a linear actuator to adjust the length of the optical circuit.

Adjusting the length of the optical circuit may provide fine control over the temporal profile and width of a combined pulse. The controller 122 may be programmed to control an energy source to produce pulses 124 having a desired duration and periodicity, to control rotation of the wave plates 102 and 112 to control replication and splitting of the pulses, and to control the length of the optical circuit 136 using the actuators 144 and 142 to produce a wide variety of shaped energy pulses. In some embodiments, the pulse width controller 100 may alter the frequency of pulses in a pulse train, for example by doubling the frequency. In such embodiments, pulse amplitude is typically lowered by interaction with the pulse width controller 100 if the optical circuit 136 has a transit time less than the periodicity of the pulses. However, if the transit time of the optical circuit 136 is greater than the periodicity of the pulses, the pulse width controller 100 may be tuned to function as a pulse amplifier by delaying pulses such that a first pulse travels through the optical circuit 136 and emerges in co-propagating relation to a second incident pulse partially reflected by the polarizing beam splitter 106.

Figure 2:
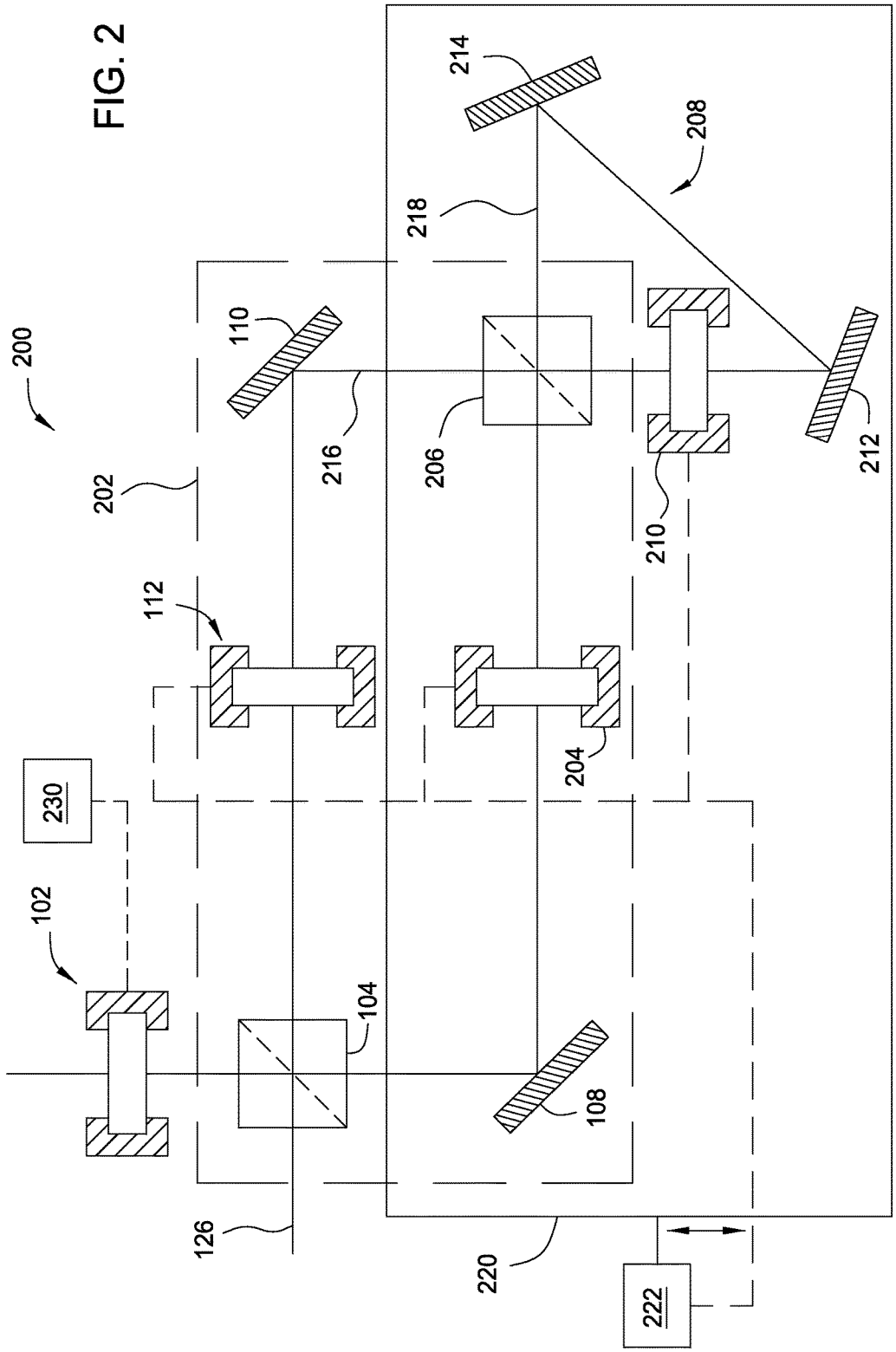
FIG. 2 is a schematic diagram of a pulse width controller according to another embodiment.

FIG. 2 is a schematic diagram of a pulse width controller 200 according to another embodiment. The pulse width controller 200 features many of the same components as the pulse width controller 100. In the embodiment of FIG. 2, however, the pulse width controller 200 has a first optical circuit 202 and a second optical circuit 208 nested within the first optical circuit 202. The rotatable wave plate 102 and the polarizing beam splitter 104 control radiation admitted into the first optical circuit 202, as with the pulse width controller 100 of FIG. 1, but a second polarizing beam splitter 206 is positioned between the first reflector 108 and the second reflector 110 of the first optical circuit 202. The second polarizing beam splitter 206 reflects a portion of incident electromagnetic radiation along a second reflecting axis 216 and transmits the remainder along a second transmitting axis 218, the fraction reflected and transmitted being dependent on the relative polarization angles of the second polarizing beam splitter 206 and a third rotatable wave plate 204 which, in alternate embodiments, may be non-rotatable.

The transmitted radiation is circulated around the second optical circuit 208 by a third reflector 214 and a fourth reflector 212 and through a fourth wave plate 210, which may be a rotatable wave plate, as described above. There may be, of course, more than two reflectors in the second optical circuit 208.

The second optical circuit 208 further broadens the radiation propagating within the first optical circuit 206 according to similar effects. If the transit time of the second optical circuit 208 is less than the time duration of the energy pulse incident on the second polarizing beam splitter 206, the radiation that propagates along the second reflecting axis 216 will propagate as a broadened pulse, which will further broaden the radiation ultimately propagating along the first reflecting axis. The four wave plates 102, 112, 204, and 210, may be independently controlled to produce a radiation pulse along the first reflecting axis 126 that has a much broader range of temporal shapes and durations than are available with a single optical circuit. Pulse width control circuits may be nested, as the second optical circuit 208 is nested within the first optical circuit 202, to any desired depth. Alternately, or additionally, pulse width control circuits such as the second optical circuit 208 may be proliferated in series around the first optical circuit 202. Any combination of serial and nested pulse width control circuits may be employed to achieve a desired control over pulse width, and all actuated wave plates may be controlled by a controller to provide precise control over the pulse shape and duration.

The pulse width controller 200 has an actuator 222 coupled to a support 220 for moving portions of the first optical circuit 202 and all of the second optical circuit 208 to control overall transit time of the optical circuit 202. Because the optical circuit 202 is arranged according to a rectilinear configuration, the actuator 222 may adjust the length of the optical circuit 202 by moving coaxial components of the optical circuit 202 in a direction perpendicular to their common optical axis. The second optical circuit 208 is coupled to the support 220 to maintain alignment with the actuated components of the first optical circuit 202. In the embodiment of FIG. 2, the first reflector 108, the third reflector 212, the fourth reflector 214, the third wave plate 204, the fourth wave plate 210, and the second polarizing beam splitter 206 are all coupled to the support 220 and the actuator 222 adjusts a distance between the first polarizing beam splitter 104 and the first reflector 108 and a distance between the second polarizing beam splitter 206 and the second reflector 110 to adjust length of the optical circuit 202. Naturally, an alternate embodiment may couple the second reflector 110 and all components of the second optical circuit 208 to a support to adjust a distance between the third wave plate 204 and the second polarizing beam splitter 206 and a distance between the second reflector 110 and the second wave plate 112 to adjust length of the optical circuit 202. A controller 230 is coupled to the wave plates 102, 112, 204, and 210, and to the actuator 222, to control the performance of the pulse width controller 200.

Figure 3:
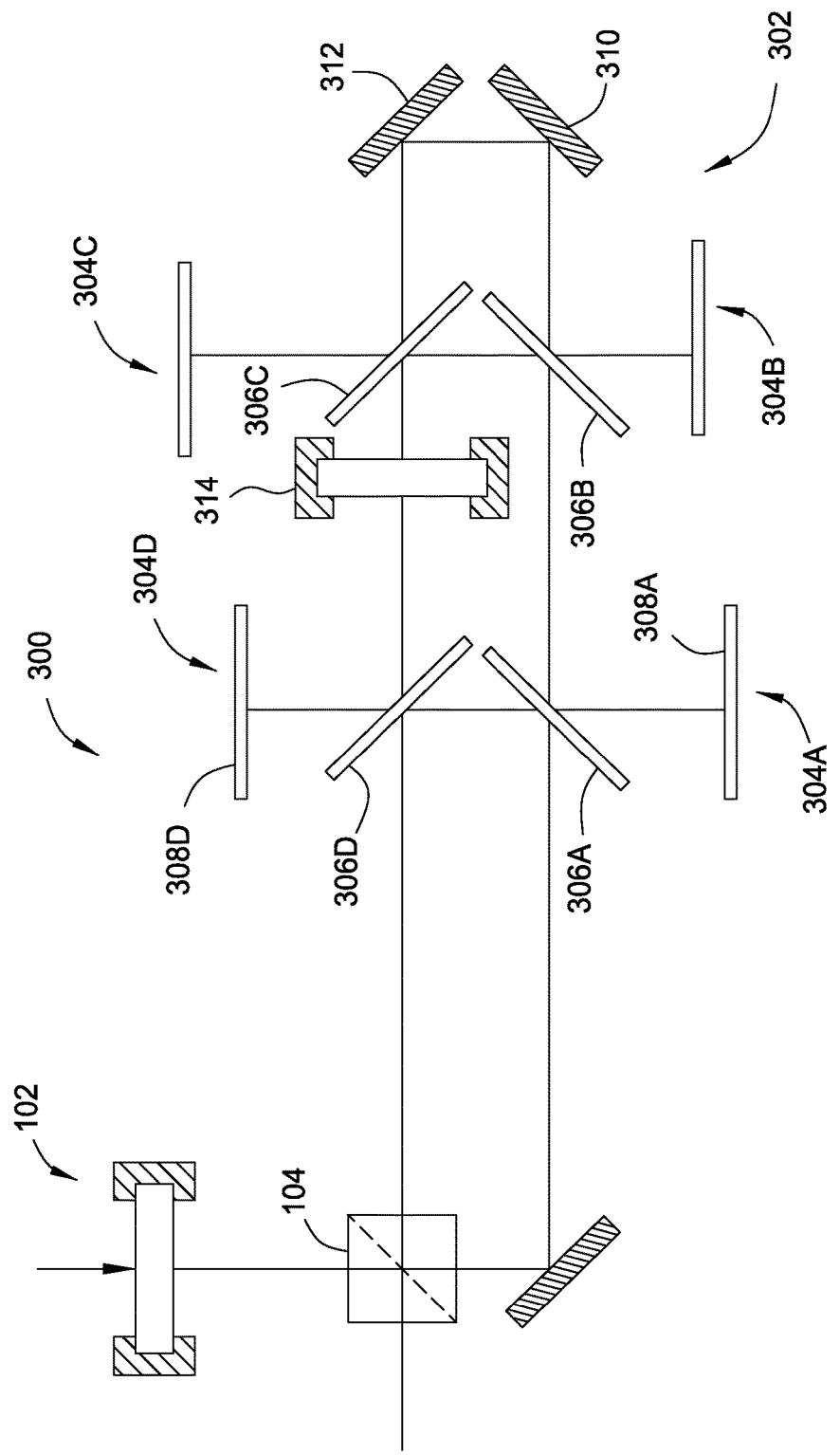
FIG. 3 is a schematic diagram of a pulse width controller according to another embodiment.

FIG. 3 is a schematic diagram of a pulse width controller 300 according to another embodiment. The pulse width controller 300 of FIG. 3 features the same entrance regulating features, the rotatable wave plate 102 and the polarizing beam splitter 104, with a different optical circuit 302. The optical circuit 302 features delay legs 304 interposed along the optical circuit 302 to add transit time and subdivisions to the optical circuit 302, if desired. Each delay leg 304 features a partial reflector 306 and a full reflector 308, and one delay leg 304 may be optically coupled to another delay leg 304 to increase the pulse-broadening effect of the optical circuit 302. The pulse width controller 300 has four delay legs 304A, 304B, 304C, and 304D. Radiation incident at partial reflector 306A is partially reflected toward the partial reflector 306D and partially transmitted toward the partial reflector 306B. Radiation incident at partial reflector 306B is partially reflected toward partial reflector 306C and partially transmitted toward two full reflectors 310 and 312 that direct the radiation around to partial reflector 306C. The radiation incident at partial reflector 306C from full reflector 312 is partially reflected toward full reflector 304C and partially transmitted toward the partial reflector 306D. Radiation reflected toward the full reflector 304C is reflected back toward the partial reflector 306C, which subdivides the radiation further. The radiation circulating and counter-circulating within the optical circuit 302 is attenuated into a smeared-out pulse that is subjected to the polarization angle of the wave plate 314, which may be a rotatable wave plate similar to the rotatable wave plate 102, producing the same transmission/recirculation effect at the polarizing beam splitter 104.

The delay legs 304 introduce transit time and counter-circulation to the optical circuit 302 that is not present in the optical circuits 136, 202, and 208, but at the expense of some energy loss. The various reflective and refractive surfaces scatter a small amount of incident radiation, so the combined effect of many delay legs may result in power losses that are more than desired. It should be noted that delay legs, such as the delay legs 304 may be used in combination with auxiliary optical circuits such as those described above in connection with FIG. 2. For example, a rotatable wave plate and polarizing beam splitter may be positioned along the optical axis between the full reflector 310 and the full reflector 312 to anchor an optical circuit such as the optical circuit 208, if desired. The combination of optical circuits and delay legs may provide expanded options for tailoring of pulse widths and energy profiles.

Figure 4:
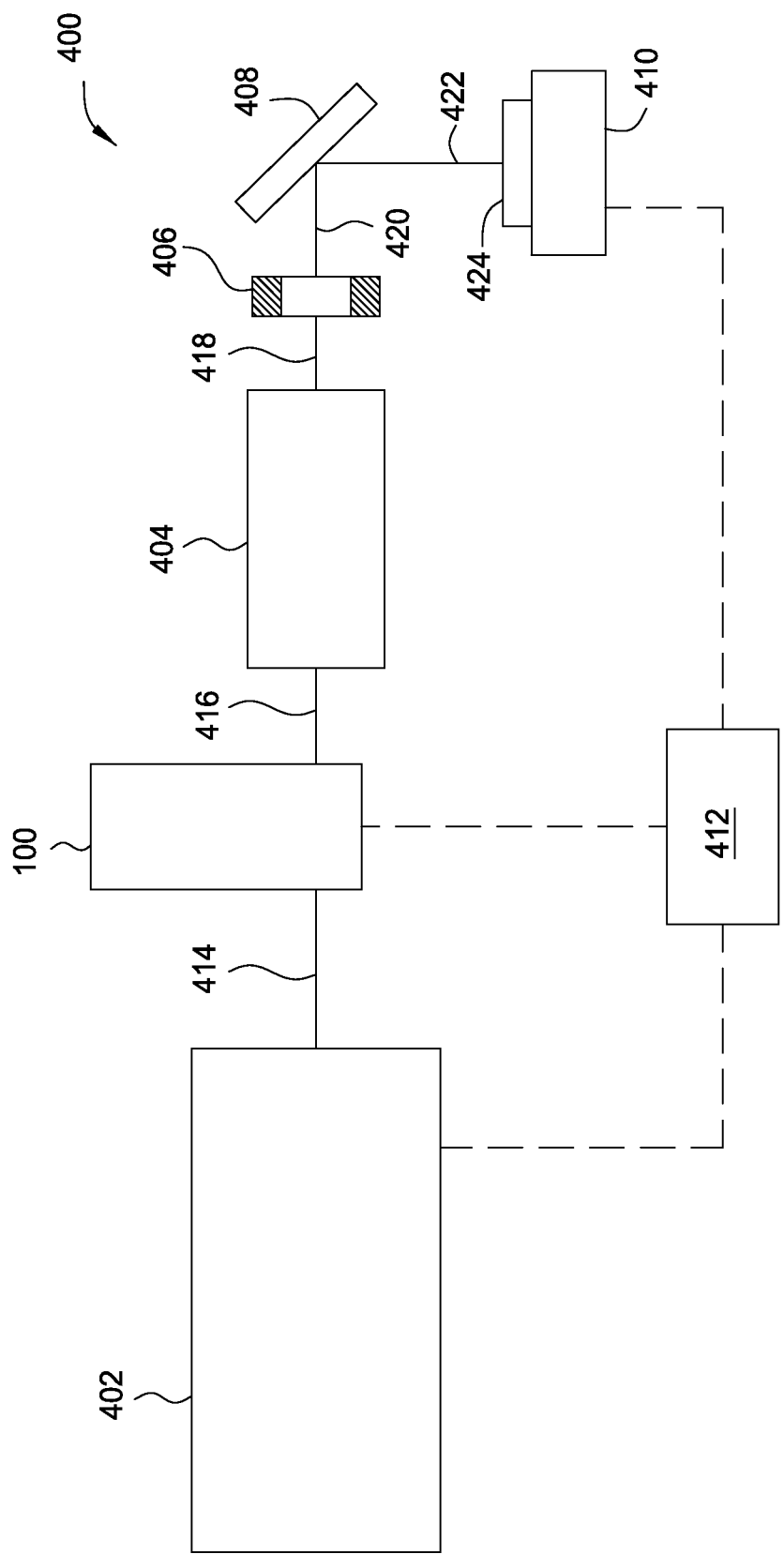
FIG. 4 is a plan view of a thermal processing system according to another embodiment.

FIG. 4 is a plan view of a thermal processing apparatus 400 according to another embodiment. A radiant energy source 402 produces a directed radiant energy field that propagates along a first optical axis 414. The directed radiant energy field enters a pulse width controller such as the pulse width controller 100, and emerges along a second optical axis 416 having a tailored temporal profile, as described above. The pulse width controllers 200 and 300, and other embodiments of pulse width controllers described herein, may also be used.

The radiant energy emerging from the pulse width controller 100 enters an optical system 404 that further shapes the radiant energy field according to the needs of the application. The optical system 404 may feature lenses, filters, prisms, partial and total reflectors, such as mirrors and retroreflectors, etalons, fiber optics, and similar components, to transform the radiant energy field in particular ways. The optical system 404 may feature one or more arrays of lenses that overlap portions of the radiant energy field to form a blended, or homogenized, image with reduced spatial variation. The optical system 404 may also feature differential delay optics such as fiber bundles and etalons to reduce coherence in the radiant energy field. The differential delay optics may also be effective to reduce variation in the temporal profile of the energy field emerging from the pulse width controller 100.

The radiant energy emerges from the optical system 404 along a third optical axis 418 to encounter an aperture 406. The aperture 406 trims the radiant energy field to a desired shape and removes edge nonuniformities of the radiant energy field. The resulting energy emerges along a fourth optical axis 420, and is directed toward a substrate support 410 by any suitable steering optic 408, such as a mirror, or any system of reflective and refractive optics for directing the radiant energy toward the substrate support 410. The radiant energy generally approaches the substrate support 410 along a fifth optical axis 422, which may be generally perpendicular to the plane of a substrate support surface 424 of the substrate support 410, or may be inclined at a desired angle. The angle of incidence of the fifth optical axis 422 with respect to the substrate support surface 424 is typically between about 85° and about 90°, usually about 90°.

A substrate positioned on the substrate support 410 is subjected to the radiant energy for thermal or optical processing. If the radiant energy field does not cover the entire substrate, the substrate support 410 may be movable in a plane defined by the substrate support surface 424 of the substrate support 410. A precision x-y stage may be used for such purposes. A first treatment zone may be positioned in the path of the fifth optical axis 422, and after processing the substrate may be moved in the plane parallel to the substrate support surface 424 such that a second treatment zone is positioned in the path of the fifth optical axis 422 for processing. This process may be repeated until all desired areas of the substrate are processed. It should be noted that, although FIG. 4 depicts a substrate resting on a substrate support and facing upward toward the fifth optical axis 422, the substrate may be oriented vertically, or substantially vertically, and may be positioned above the fifth optical axis 422. The substrate support 410 may be oriented at any desired angle.

In one aspect, the energy source 402 may be a pulsed energy source or a continuous wave energy source. The energy source 402 may emit radiant energy having any desired coherence and any desired frequency. The pulse width control methods and apparatus described herein are not substantially different for radiation having a broad spectral range, spectral distribution range, and coherency range. Continuous wave and pulse lasers may be used, individually or in combination, to produce desired temporal profiles of pulsed energy having any spectral characteristics or combination thereof.

The apparatus described herein are also embodiments of novel methods. The temporal profile of an incident pulse of radiant energy may be effectively controlled by splitting the pulse into a first sub-pulse and a second sub-pulse using differential polarity, routing the second sub-pulse through an optical circuit to delay propagation of the second sub-pulse relative to the first sub-pulse, and releasing the second sub-pulse after a delay to propagate along the same axis as the first sub-pulse. If the delay of the optical circuit is substantially less than a duration of the incident pulse, the two sub-pulses emerge in an overlapping temporal relationship, effectively producing a broadened pulse. The optical circuit is constructed using reflectors that route the second sub-pulse around a polygonal path so that the second sub-pulse returns to the location at which it was divided from the first sub-pulse.

The differential polarity may be provided using a wave plate that is rotated to control the polarization angle of the incident pulse. The incident pulse is directed to a polarizing beam splitter that reflects a portion of the incident pulse, depending on the difference in polarity alignment of the incident pulse and the polarizing beam splitter, to form the first sub-pulse. The unreflected portion is transmitted into the optical circuit as the second sub-pulse.

The second sub-pulse may be further subdivided to broaden the resulting recombined pulse further. As the second sub-pulse approaches the recombination point where the first and second sub-pulses were first divided, differential polarity may again be employed to split the second sub-pulse into further sub-pulses, one of which transits the optical circuit again. In this way an energy pulse with a long decay may be formed as a series of time overlapping, decaying amplitude, sub-pulses.

The temporal shape of the resulting pulse may be adjusted by adjusting the relative phases of the differential polarity applicators with respect to the polarity of the polarizing beam splitter. The length of the optical circuit may also be adjusted along with the polarizers to afford further control over the shape of the resulting pulse.

A train of regular energy pulses with simple periodicity may be transformed in complex ways by changing periodicity and amplitude of the resulting pulses by routing the pulses through a differential polarity delay circuit as described herein. The fractions reflected and transmitted at each beam splitter, and the length of the delay circuit, may be controlled relative to duration and periodicity of the incident pulse train to produce a wide variety of complex patterns of periodicity, amplitude, and temporal profile.

A train of energy pulses having complex periodicity and amplitude patterns, produced for example using a plurality of energy sources such as switched lasers under the control of electronic timers, may be folded into a pulse train having a wide variety of characteristics from very regular to extremely irregular depending on architecture and tuning of the optical circuitry used to subdivide and recombine the pulses. Depending on the interaction of the periodicity and amplitude pattern of the incident pulse train with the time constants of the optical circuit and the settings of the differential polarity splitters, a very irregular train of pulses may be effectively regulated by tuning the optical circuit to produce sub-pulses that substantially overlap in a regular manner.

Figure 5:
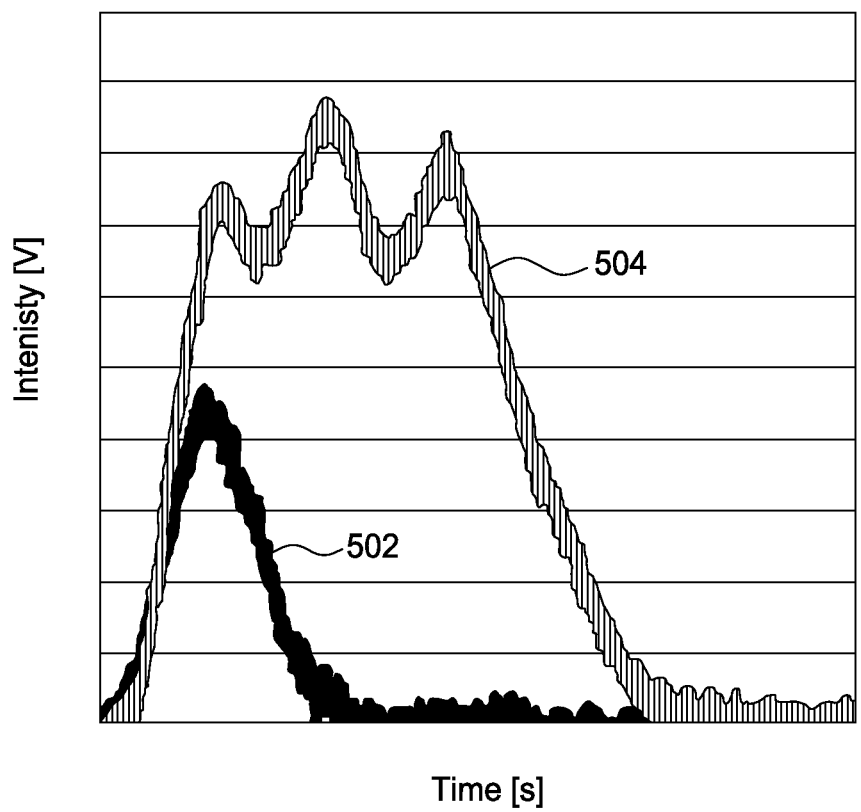
FIG. 5 is a graph showing pulse intensity as a function of time for an energy pulse processed using apparatus and methods of FIG. 1-4.

FIG. 5 is a graph showing pulse intensity as a function of time for an energy pulse processed using apparatus and methods of FIGS. 1-4. The temporal profile of the incident energy pulse is shown at 502, and the temporal profile of the resultant energy pulse is shown at 504 after passing through a pulse width controller according to an embodiment described herein. The amplitudes of the two profiles are not represented on the same scale, so that the general shape of each profile is distinguishable from the other. The time evolution of each profile is plotted on the same scale, however, to demonstrate that the incident pulse has been made longer in time by passing through a pulse width controller according to an embodiment described herein.

While the foregoing is directed to embodiments of the present invention, other and further embodiments of the invention may be devised without departing from the basic scope thereof, and the scope thereof is determined by the claims that follow.

The invention claimed is:
1. An optical apparatus, comprising:
a first rotatable wave plate having an optical axis;
a polarizing beam splitter with a reflecting axis and a transmitting axis, wherein the transmitting axis is substantially parallel to the optical axis of the first rotatable wave plate;

a first reflector positioned along the transmitting axis and propagating a first deflected electromagnetic radiation along a first deflection axis; and a second reflector positioned to receive electromagnetic radiation originating from the first reflector and propagate a return electromagnetic radiation to the polarizing beam splitter along the reflecting axis.

2. The optical apparatus of claim 1, further comprising a second rotatable wave plate having an optical axis substantially parallel to the reflecting axis of the polarizing beam splitter.

3. The optical apparatus of claim 1, wherein the second reflector is positioned along the first deflection axis.

4. The optical apparatus of claim 1, further comprising a third reflector positioned along the first deflection axis and facing a second deflection axis, and the second reflector is positioned along the second deflection axis.

5. The optical apparatus of claim 1, wherein the second rotatable wave plate is positioned between the second reflector and the polarizing beam splitter.

6. The optical apparatus of claim 2, further comprising a first actuator coupled to the first rotatable wave plate and a second actuator coupled to the second rotatable wave plate, and a controller coupled to the first actuator and the second actuator.

7. The optical apparatus of claim 2, further comprising a second polarizing beam splitter positioned along the first deflection axis, the second polarizing beam splitter having a second reflecting axis and a second transmitting axis, wherein the second reflector is positioned along the second reflecting axis.

8. The optical apparatus of claim 7, further comprising a third wave plate positioned between the first reflector and the second polarizing beam splitter, a plurality of reflectors to receive a transmitted electromagnetic radiation along the second transmitting axis and direct the transmitted electromagnetic radiation along a circuit, and a fourth wave plate positioned in the circuit to receive the transmitted electromagnetic radiation and propagate a second return electromagnetic radiation along the second reflecting axis.

\* \* \* \* \*